United States Patent
Viaud et al.

(12) 
(10) Patent No.: US 6,793,226 B2
(45) Date of Patent: Sep. 21, 2004

(54) SUSPENSION FOR A LARGE ROUND BALER

(75) Inventors: Jean Viaud, Gray (FR); Aurelien Chabassier, Dampmart (FR)

(73) Assignee: Deere & Company, Moline, IL (US)

( * ) Notice: Subject to any disclaimer, the term of this patent is extended or adjusted under 35 U.S.C. 154(b) by 126 days.

(21) Appl. No.: 10/060,129

(22) Filed: Jan. 31, 2002

(65) Prior Publication Data

US 2003/0024408 A1 Feb. 6, 2003

(30) Foreign Application Priority Data

Feb. 8, 2001 (DE) .......................................... 101 05 849

(51) Int. Cl.⁷ .............................................. B60G 9/00
(52) U.S. Cl. ............................. 280/124.11; 280/124.12; 280/1; 267/269
(58) Field of Search .................. 280/124.11, 124.114, 280/124.116, 124.121, 124.108, 124.177, 124.178, 124.128, 124.129; 267/267, 269, 270, 271

(56) References Cited

U.S. PATENT DOCUMENTS

| | | | | |
|---|---|---|---|---|
| 2,757,017 A | * | 7/1956 | Matthias et al. | 280/124.116 |
| 3,807,752 A | * | 4/1974 | Mauck | 280/81.1 |
| 5,037,126 A | * | 8/1991 | Gottschalk et al. | 280/124.116 |
| 5,246,248 A | * | 9/1993 | Ferguson | 280/5.524 |
| 5,330,222 A | * | 7/1994 | Halverson et al. | 280/438.1 |
| 5,954,350 A | * | 9/1999 | Santo et al. | 280/124.107 |
| 5,988,672 A | * | 11/1999 | VanDenberg | 280/683 |
| 6,286,857 B1 | * | 9/2001 | Reese et al. | 280/683 |
| 6,354,614 B1 | * | 3/2002 | Ham et al. | 280/124.11 |
| 6,508,482 B2 | * | 1/2003 | Pierce et al. | 280/124.116 |

FOREIGN PATENT DOCUMENTS

DE 197 25 699 6/1997

* cited by examiner

*Primary Examiner*—David Dunn

(57) ABSTRACT

A large round baler includes a pair of ground wheels carried at opposite ends of an axle which is suspended from the frame of the baler by a pair of parallel, transversely spaced arms having first ends secured to the axle, and having second ends coupled to the frame by a self-aligning bearing assembly.

7 Claims, 4 Drawing Sheets

SUSPENSION FOR A LARGE ROUND BALER

FIELD OF THE INVENTION

The present invention concerns the suspension of an axle of a towed agricultural utility vehicle or implement.

BACKGROUND OF THE INVENTION

From DE-A-197 25 699, a large round baler is disclosed whose wheels engage the ends of an axle, free to rotate, where the axle is connected on each side by means of a leaf spring configured as an arm connected to the frame of the baler so as to pivot vertically against the resistance of a damper element at the opposite end of the spring from the pivot connection of the leaf spring to the frame. The pivot connection of the leaf spring to the frame is formed by an eye on the leaf spring and a pin. The springs are used simultaneously for preventing movement in the sideways direction of the axle and of the wheels.

The problem underlying the invention is seen in the fact that on the basis of the varying conditions of the ground, the wheels on each side are accelerated at different rates and the springs are deflected to differing degrees, so that the axle does not always remain parallel to the pivot axis that extends through the bearings and thereby applies loads to the bearings.

SUMMARY OF THE INVENTION

According to the present invention there is provided an improved suspension for an axle assembly.

An object of the invention is to provide a suspended axle assembly constructed so as to eliminate loading to the bearings mounting spaced arms of the assembly to a vehicle frame.

A more specific object of the invention is to provide spherical or self-aligning bearings for mounting the arms, which are fixed to the ground wheel axle, to the vehicle frame.

Another object in accordance with a second embodiment of the invention is to provide bearings embodying resilient members which deflect so as to avoid undue loading of the bearings.

These and other objects will become apparent from a reading of the ensuing description together with the appended drawings.

DESCRIPTION OF THE PREFERRED EMBODIMENT

Figure 1:
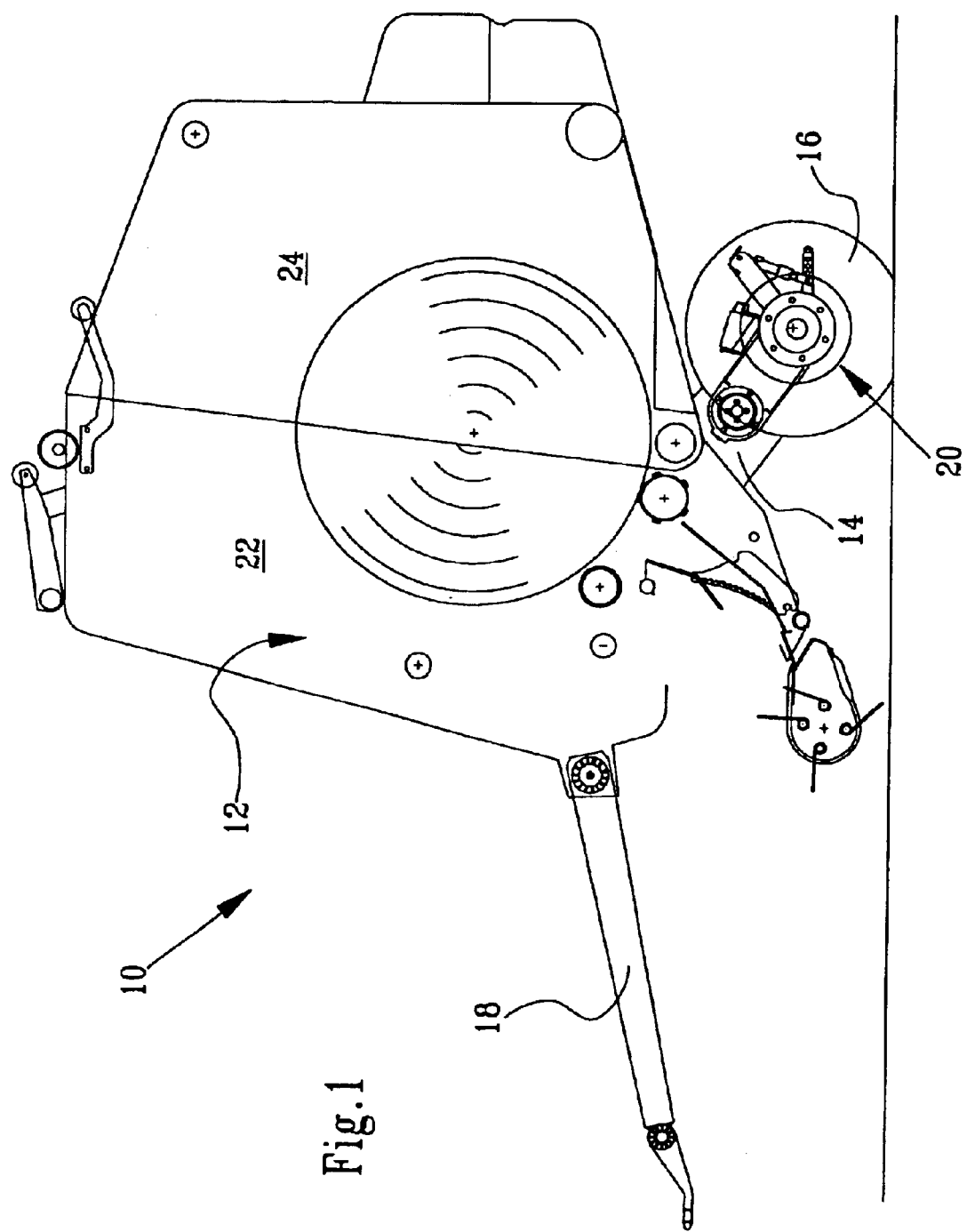
FIG. 1 is a schematic left side elevational view of a large round baler equipped with an axle suspended in accordance with the principles of the present invention.

Referring now to FIG. 1, there is shown an implement or vehicle 10 shown generally in the form of a large round baler of a known configuration, including a baling chamber housing 12, frame 14 and support wheels 16 and that can be equipped as a fixed chamber baler or as one with a baling chamber of variable size. A tongue or tow bar 18 is fixed to the front of the frame 14 for attachment to a tractor so as to be towed across a field. When the implement 10 is towed across a field whose surface is uneven and rough, the baling chamber housing 12 and frame 14 are caused to bounce. In operation on paths and roads, it behaves similarly, since there greater speeds are reached. The configuration as a large round baler is a preferred application for the invention, that is described below, since such balers are being operated with increasing speed on the field and on the roads and carry increasing weight, in the form of a loaded cylindrical bale, that could lead to damage in case of bumps due to uneven terrain. However, other towed agricultural implements that could use the invention with advantage include a forage harvester, a mowing implement, a haymaking machine, a hay recovery machine, a sowing or planting machine or the like.

The baling chamber housing 12 is composed of a front part 22, fixed to and forming part of the frame 14, and a rear part 24 connected to an upper rear location of the front part 22 for pivoting vertically in a known manner (not shown). In the baling chamber housing 12 a multitude of baling elements, not shown, are provided, such as baling rolls, by means of which a cylindrical bale can be produced.

The frame 14 carries the parts 22 and 24 of the baling chamber 12 and is connected in front with the tow bar 18, where the connection is made rigidly with seam welds, screws and/or rivets. In the lower region of the frame 14, a connection is provided on each side for the suspension 20, each of which is configured as a recess, that is not visible.

The wheels 16 engage opposite ends of an axle 28, free to rotate, and support the frame 14 on the ground. The wheels 16 are mounted to wheel hubs 30 which, in turn, are equipped with braking arrangements 32.

The tow bar 18 is used to connect the vehicle 10 to a towing vehicle, not shown, for example, an agricultural tractor.

The suspension 20 of the wheels 16 includes a U-shaped assembly defined by the axle 28 and an arm 34 on each end of the axle 28, and, associated with each arm 34 is a spherical bearing 36. The suspension 20 is used to connect the wheels 16 with the frame 14 of the vehicle 10. In this special embodiment, a further axle 38 forms part of the frame 14 and the arms 34 are respectively connected to the opposite ends of the axle 38. While the bearings 36 could also be attached directly to the frame 14 without using the axle 38, it appears more advantageous for the sake of the pattern of forces and for stability to provide them on the axle 38 that is rigid in itself, that can be fastened to the frame 14, for example by means of flanges or by a welded connection.

The axle 28 is configured in the form of a tube with a square or rectangular cross section, that extends the entire width of the baling chamber housing 12 and beyond the arms 34. This axle 28 in itself could also be used in the same way on another agricultural vehicle without the suspension 20 according to the invention. The wheel hubs 30 include brake drums forming parts of the braking arrangements 32 and are supported in bearings, free to rotate, on the ends of the axle 28.

Figure 3:
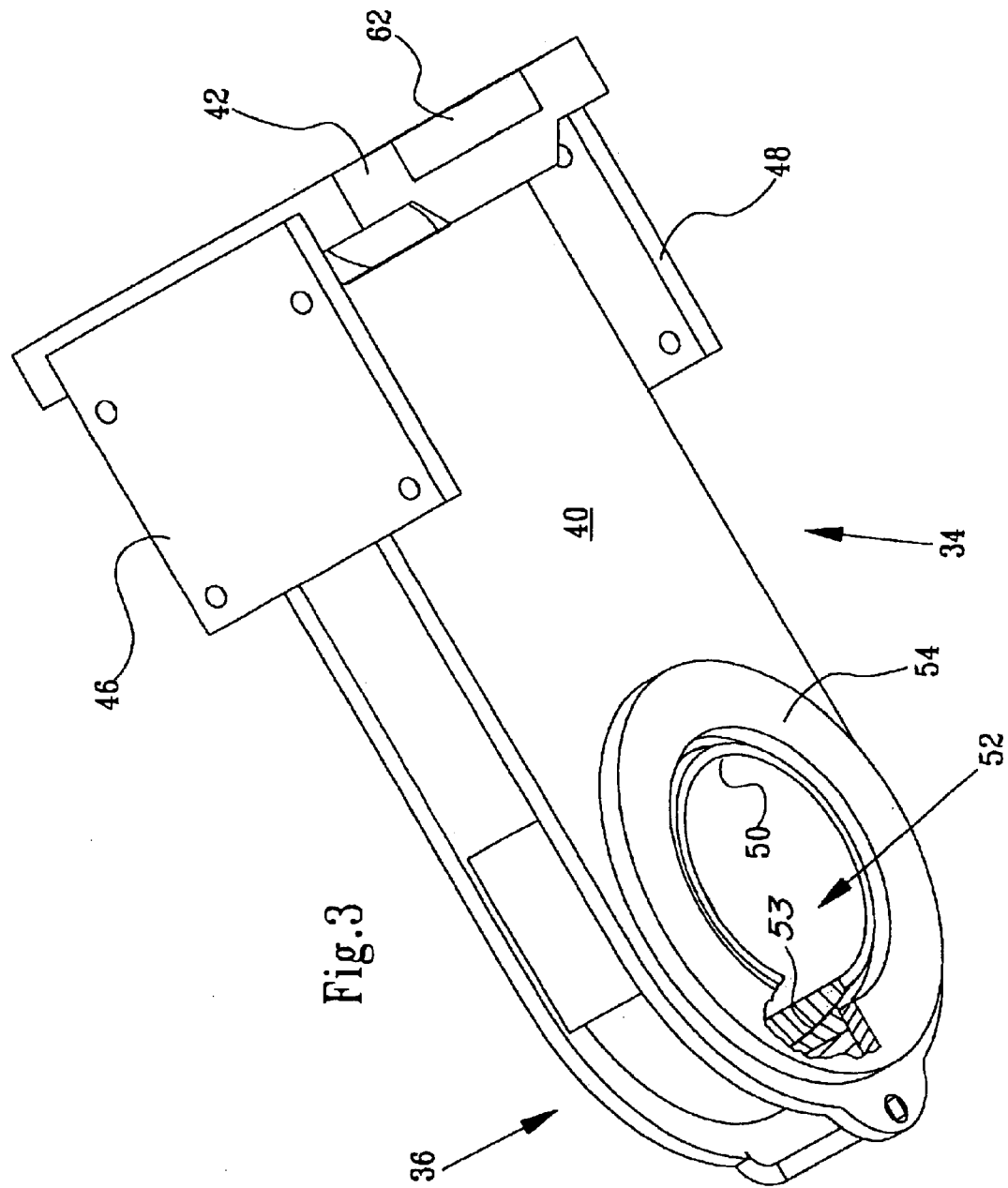
FIG. 3 is a perspective view of one of the arms of the suspension, with a portion broken away and sectioned to reveal the spherical bearing ball chamber.

Each arm 34 is configured according to the illustration in FIG. 3 and has an elongated shape. In general, the arm 34 consists of a rectangular tube 40 standing on edge in the assembly that carries a flange 42 on its rear end region, the right end region in FIG. 3, and on its forward end region carries the spherical bearing 36 and is provided with a bore, not visible, through which the further axle 38 can extend. The arm 34 is configured generally as a weldment that establishes the connection between the frame 14 and the axle 28 and is arranged outside the frame 14. Connected to the flange 42, or even as a one-piece component with it, a cover flange 46 and a bottom flange 48 are provided, which extend parallel to each other and are equipped with bores, not described in any further detail. Preferably, the flange 42, the cover flange 46 and the bottom flange 48 are welded to the rectangular tube 40.

Figure 2:
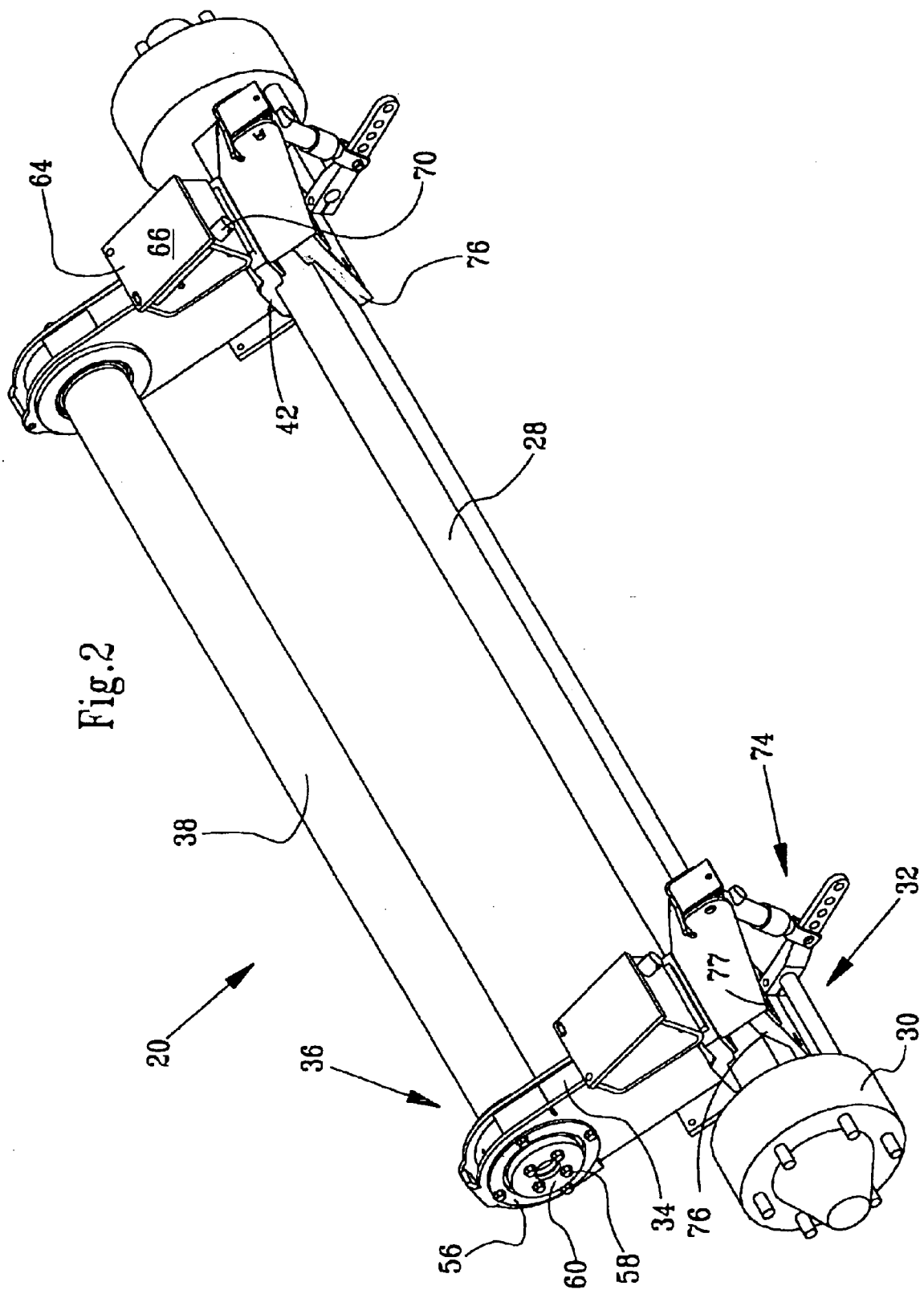
FIG. 2 is a left rear perspective view of the axle and its suspension.

The spherical bearing 36 contains a large ball segment 50 with a bore 52 extending axially through it and flattened end surfaces. This ball segment 50 is supported, free to pivot, in a congruent ball chamber 53, in a manner known in itself, in the arm 34 and is secured by means of a fixed disk 54 and a removable disk 56 against falling out of the ball chamber. Spacer means, not shown, can be provided under the removable disk 56 (FIG. 2) that make it possible to adjust the play of the ball 50 in the ball chamber. The removable disk 56 is secured with several screws 58 on each of the outer sides of the arm 34. The ball 50 is contained in the ball chamber, so as to be easily movable and permits movements of the arms 34 in the upward direction and to the side within the possible limits. The spherical bearing 36 can be lubricated if this should become necessary, where in this case seals would have to be provided between the ball chamber and the disks 54 and 56.

The further axle 38 is configured as a simple tube that is wider than the frame 14 and is inserted through cylindrical openings, not described in any further detail, in the frame 14 in order to extend beyond these. In the region of contact of the further axle 38 with the frame 14, these are welded to each other. In principle, the further axle 38 could be replaced by stub axles that are connected to each side. However, the one-piece further axle 38 has the advantage that it reinforces the frame 14 itself. The further axle 38 is dimensioned in such a way that it engages the ball 50 with little play or rigidly on its end regions. The further axle 38 is retained axially against the ball 50 on each side by means of a cover 60.

It is here noted, that in lieu of the spherical bearings 36, a coupling between each of the arms 34 and the frame 14 could be provided which includes a cylindrical bushing encased in a block of resilient material housed within the end of a given arm 34 that receives a cylindrical pin carried at a given end of the axle 38. In this case, when the wheels 16 undergo uneven deflection resulting in twisting being applied to the U-shaped assembly composed of the axle 28 and the arms 34, the resilient material will deflect and absorb forces that would otherwise be transferred to the bearing surfaces established between the bushings and pins.

The flange 42 extends generally vertically or at a right angle to the direction of the principle extent of the rectangular tube 40 and is provided with a recess 62 extending in the direction of the main extent of the axle 28 into which the axle 28 can be inserted in certain regions in order to form a positive locking engagement.

Figure 4:
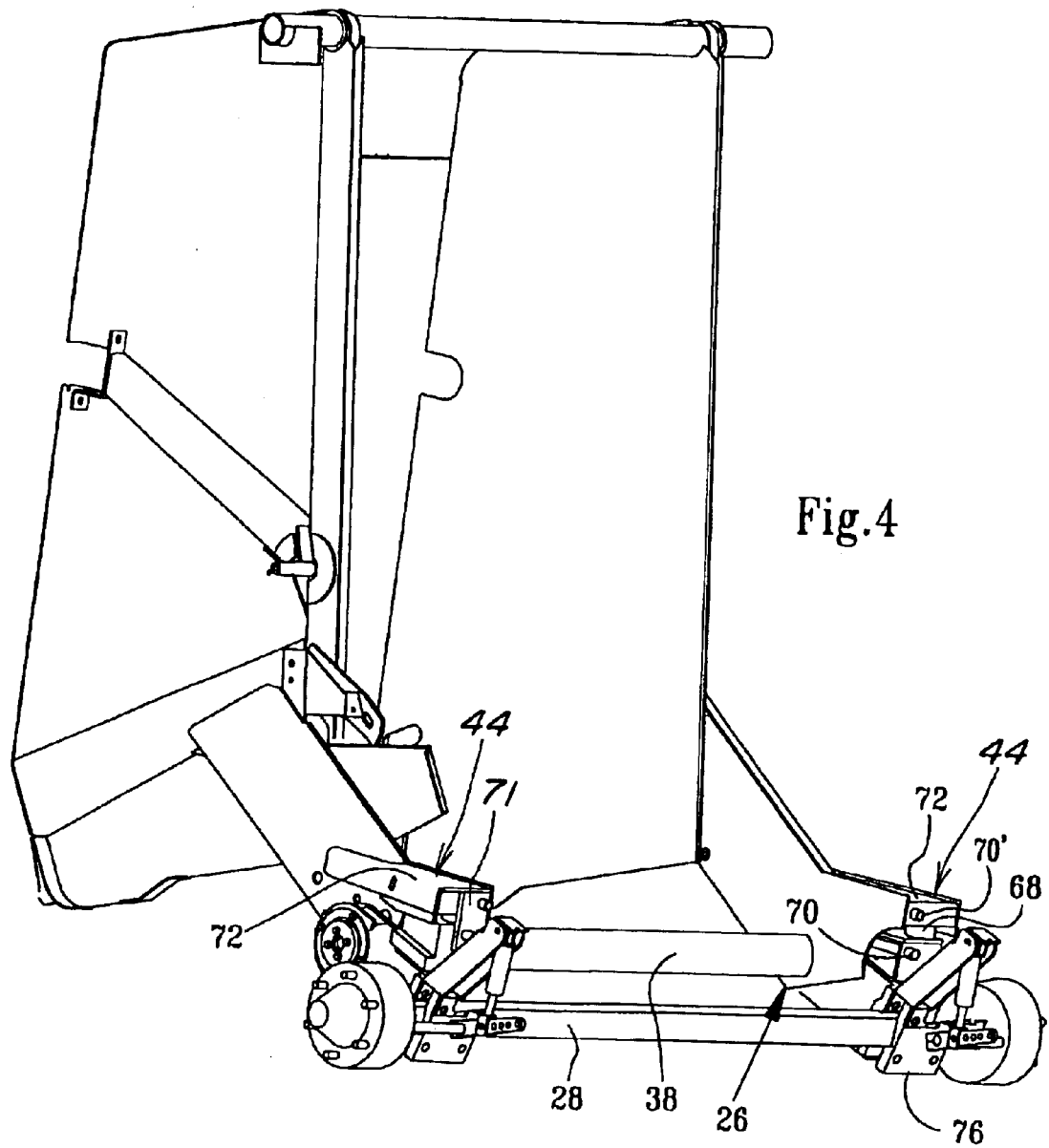
FIG. 4 is a left rear perspective view showing the baler frame and the suspended axle assembly.

The cover flange 46 and the bottom flange 48 are identical and configured symmetrically about a generally horizontal plane, this makes it possible to turn the arm 34 through 180° about its longitudinal axis, so that it can be applied on the left and on the right side. The cover flange 46 and thereby the bottom flange 48 as well are used, with bores provided in them, for the removable engagement of a stop 64 that is configured as a housing in the form of an irregular trapezoid, whose surface provides a seat 66 for a spring 68, that can be seen in FIG. 4. In the present embodiment, the stop 64 is configured in a wedge shape in such a way that, in the installed condition, the seat 66 extends generally parallel to the lower end surface of the spring 68. On the rear side of the stop 64, a peg 70 is provided through which a radial bore extends, that is not described in any further detail, which may receive a cotter pin. The peg 70 may be configured as a pin that penetrates the stop 64.

The frame 14 is provided on its rear end on each side with an open-bottomed housing 72, that is connected, particularly welded, above the spherical bearings 26 to the outside of the frame 14. The housing 72, that is open downward and aligned vertically with the seat 66, is used to engage the spring 68. On the rear side of the housing 72 and in vertical alignment with the peg 70, a peg 70' of identical configuration is attached. A bracket 71, shown only on the left-hand side in FIG. 4, with two bores, whose spacing corresponds to the spacing of the pegs 70 and 70', when the suspension 20 is loaded, can be provided, as shown, engaged with the pegs 70 and 70', so that a relative movement between the arm 34 and the console 44 cannot take place or can do so only to a limited degree if one of the peg-receiving bores is configured as a slot.

In the embodiment shown, the spring 68 is configured as a rubber block, that is enclosed in the housing 72 so that it cannot be lost, has an upper surface in contact with the cover of the housing 72 and has a lower surface engaged with the seat 66. In different embodiments, the rubber block could be replaced by a helical compression spring or a package of Belleville springs.

The wheel hubs 30 are configured in the usual manner so that each can engage a wheel 16. In each of the wheel hubs 30, a brake shoe arrangement of the braking assembly 32 is provided of which only one actuating arrangement 74 can be seen, which uses linkages and servo motors, not shown. The actuating arrangement 74 is mounted on a plate 76 that can be bolted to the flange 42 of the arm 34 and is provided with a recess, not described in any further detail, that engages the axle 28. The plate 76 and the flange 42 are clamped to each other by means of screws, not shown.

On the basis of the above description, the following configuration and the following operation are the result of the suspension 20 according to the invention.

The further axle 38 is inserted through the openings of the connection 26 in the frame 14 and secured centrally. Subsequently, when the frame 14 is raised, the arms 34 are pushed over the projecting regions of the further axle 38, the balls 50 are pushed on and secured by means of the covers 60, the removable disks 56 are bolted to the arms 34, the springs 68 are inserted into the housings 72, the stops 64 are mounted on the cover flanges 46, the axle 28 is secured to the flanges 42 by means of the plates 76 and the wheels 16 are mounted on the wheel hubs 30. If the frame 14 is now lowered, so that the wheels 16 are supported on the ground, then the frame 14 with the springs 68 presses against the seats 66. During operation, the springs 68 can deflect and dampen the shocks on the frame 14. If the vehicle rolls into depressions in the ground and the two sides experience different accelerations, then the suspension 20, that consists generally of the axle 28 and the two arms 34, can twist and can move freely enough on the further axle 38 on the basis of the spherical bearings 36, without causing any warping. In lieu of the springs 68 that are made of rubber blocks, to control the rough operation of agricultural implements it is also possible to use springs made of steel, particularly helical compression springs or helical extension springs, Belleville springs or hydraulic gas pressure springs. Further, in the case of large spring deflections or in the case of danger of vibrations or oscillations, it is possible to provide one or more shock absorbers that avoid the build-up of a resonance in the springs.

Since in operations over bumpy roads, accelerations can be encountered in the upward as well as the downward direction, it is possible that the springs 68 may be replaced with spring arrangements that operate in both directions. For example, a spring may be provided on either side of the arm or the axle, in particular a rubber block, so that the axle can move only within a short distance and is intercepted by springs in each direction.

The fact that the arms 34 may be disconnected from the axle 28 by removing the fasteners that clamp the arm flange 42 and the plate 76 has the advantage that, in the case of damage to the axle or to the arm, the entire assembly need not be replaced. It is also possible with different vehicles to use different arms with the same axles or differing axles with the same arms. Such a flange connection, that can lead to a rigid and stable assembly between the axle and the arms can also be used without the need for flexible arms or other springs, for example, for adjusting the operating height of the vehicle.

Having described the preferred embodiment, it will become apparent that various modifications can be made without departing from the scope of the invention as defined in the accompanying claims.

What is claimed is:

1. In a towed implement including a frame having opposite sides spaced transversely from each other relative to a path of travel of said implement, an axle extending over an entire width of said implement and having opposite ends respectively extending transversely beyond said opposite sides, a pair of ground wheels respectively mounted to said opposite ends of said axle, the improvement comprising: a suspension for said axle including first and second arms having rear ends respectively releasably rigidly fixed to said axle at locations inward of said pair of ground wheels; first and second coupling assemblies respectively mounting said first and second arms to said frame and respectively including first and second spherical bearings for normally establishing a horizontal transverse pivot axis about which said first and second arms may pivot vertically but also for permitting said spherical bearings to move into positions for establishing a pivot axis that is not parallel to said horizontal transverse pivot axis without introducing bending loads into said spherical bearings.

2. The towed implement, as defined in claim 1, wherein each rear end of said first and second arms includes an end each said end flange including a recess receiving said axle; and a plate disposed on an opposite side of said axle from each end flange, that is releasably clamped to said end flange and thereby securing said axle to said first and second arms.

3. The towed implement, as defined in claim 1, wherein said first and second arms are each symmetrical, from top to bottom about a transverse plane extending along a respective longitudinal axis of said arms, whereby they may be exchanged with each other when assembling them to said axle.

4. The towed implement, as defined in claim 1, and further including first and second cushioning elements respectively mounted between said frame and said arms in locations for cushioning vertical pivotal movement of said first and second arms.

5. The towed implement, as defined in claim 1, wherein said frame and said arms carry respective elements adapted for being coupled together so as to substantially prevent movement of said axle relative to said frame; and an interconnecting structure being provided for selectively coupling said respective elements together.

6. The towed implement, as defined in claim 5, wherein said respective elements comprise first and second upper pins respectively fixed to opposite sides of said frame, and first and second lower pins respectively fixed to said first and second arms at respective locations spaced vertically below said first and second upper pins; and said interconnecting structure being first and second brackets respectively provided at said opposite sides of said frame, with said first and second brackets respectively including first and second upper holes respectively receiving said first and second upper pins, and first and second lower holes respectively receiving said first and second lower pins.

7. The towed implement, as defined in claim 1, wherein said frame includes a secondary axle extending transversely in parallel relationship to said first-mentioned axle and being fixed to said opposite sides of said frame; and said first and second coupling assemblies being respectively coupled to opposite ends of said secondary axle.

* * * * *